Jan. 6, 1953     G. A. LYON     2,624,636
WHEEL STRUCTURE
Filed Dec. 20, 1951
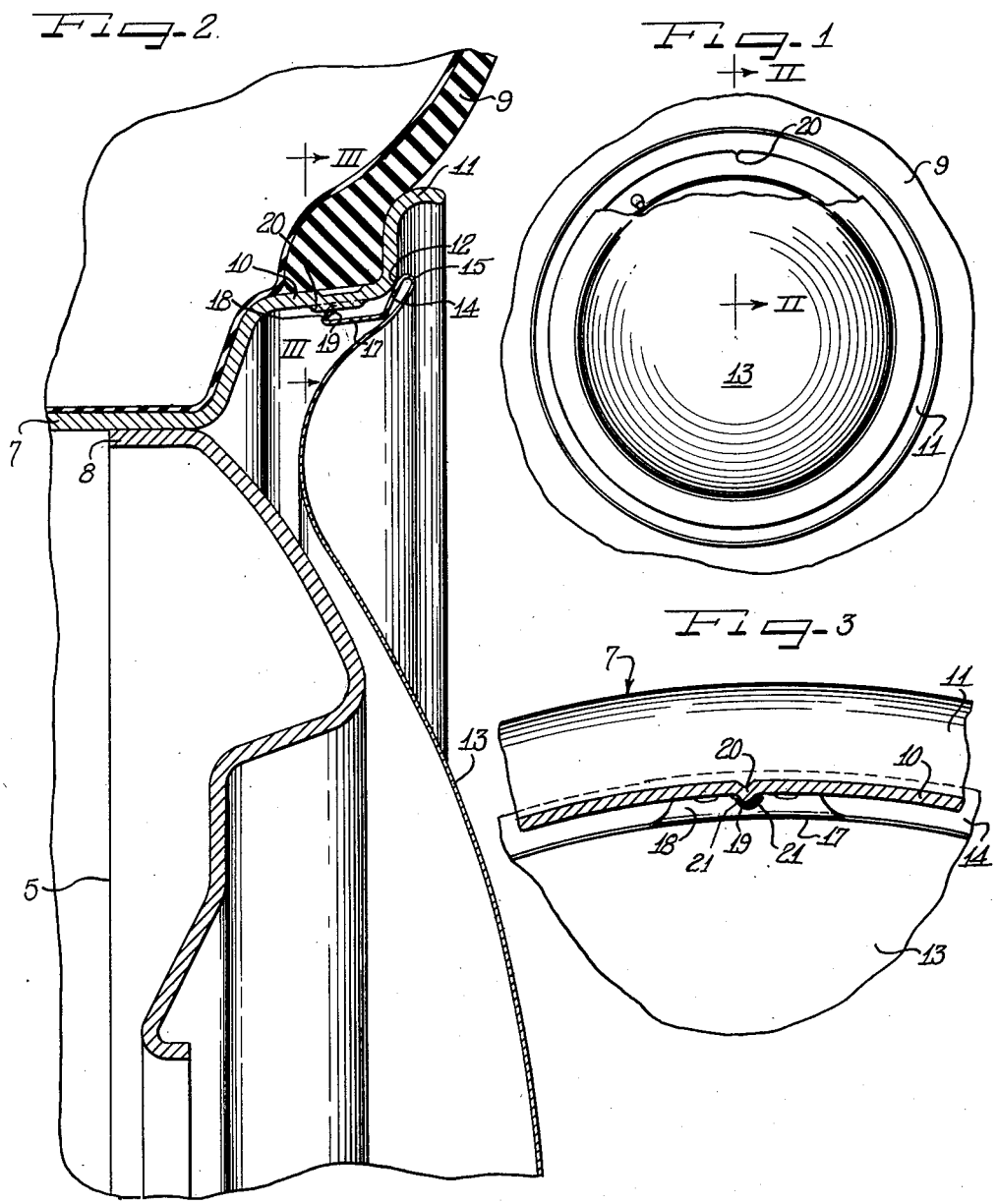
Inventor
George Albert Lyon Patented Jan. 6, 1953

2,624,636

UNITED STATES PATENT OFFICE 2,624,636

WHEEL STRUCTURE

George Albert Lyon, Detroit, Mich.

Application December 20, 1951, Serial No. 262,585

4 Claims. (Cl. 301—37)

The present invention relates to improvements in wheel structures and more particularly concerns the ornamental and protective covering of vehicle wheels and novel means for retaining a wheel cover on the wheel.

An important object of the present invention is to provide a wheel structure in which retaining means on a wheel cover and a portion of the wheel are interengaged to retain the cover against torque or turning displacement as well as axial displacement.

Another object of the invention is to provide an improved vehicle wheel having novel means thereon cooperative with retaining means on a cover for the wheel to hold the cover against turning.

According to the general features of the invention there is provided in a wheel structure including a generally axially extending part, a cover for the outer side of the wheel having retaining fingers engageable edgewise against the axially extending part of the wheel, and means on said axially extending part of the wheel interengaging with the retaining fingers to hold the cover against turning on the wheel.

According to other general features of the invention there is provided in a vehicle wheel including a generally axially extending annular part, a circular wheel cover for the outer side of the wheel including retaining fingers having generally radially extending terminal portions grippingly engageable with said generally axially extending part of the wheel for retaining the cover against axial displacement, and the axially extending part of the wheel having a generally axially extending rib, one of said fingers generally wrappingly engaging said rib.

Other objects, features and advantages of the present invention will be readily apparent from the following detailed description of a preferred embodiment thereof taken in conjunction with the accompanying drawing, in which:

Figure 1 is an outer side elevational view of a vehicle wheel having a cover thereon and with the cover partially broken away to reveal details of the wheel structure therebehind;

Figure 2 is an enlarged fragmentary radial sectional view taken substantially on the line II—II of Fig. 1; and Figure 3 is a fragmentary sectional view taken substantially on the line III—III of Fig. 2.

As shown on the drawings:

A vehicle wheel embodying the present invention comprises a wheel body 5 and a tire rim 7. The wheel body is of the pressed metal disk spider type having a peripheral flange 8 attached to the base flange of the tire rim.

The tire rim 7 is of the multi-flange drop center type adapted for supporting a pneumatic tire and tube assembly 9. The tire rim has an intermediate flange 10 and a terminal flange 11 which joins the intermediate flange on a rounded shoulder 12.

In ornamental and protective covering relation to the outer side of the wheel is a wheel cover 13 which as shown is of the full disk type which covers the wheel body and substantially covers the tire rim, although it may if desired, be a trim ring cooperating with a central hub cap to provide a full covering for the wheel.

At its outer margin, the wheel cover 13 has an underturned flange 14 providing an outer marginal reinforcing bead 15 at juncture with the wheel cover body. The flange 14 is adapted to rest against the shoulder 12 of the tire rim. Extending generally axially inwardly from the inner portion of the flange 14 is a series of retaining fingers 17. These retaining fingers are in suitable number spaced apart in a uniform annular series behind the margin of the cover on a smaller diameter than the inner diameter of the tire rim flange 10.

Each of the fingers 17 has a generally radially and axially outwardly extending short and stiff terminal flange 18 of substantial width adapted for edgewise retaining gripping engagement with the intermediate flange 10 of the tire rim.

In the unassembled condition of the cover, the retaining fingers 17 are flexed somewhat radially outwardly beyond the position shown in Figs. 2 and 3 so that the retaining edges of the terminal flanges 17 extend to a greater diameter than the inner diameter of the intermediate flange 10 of the tire rim. Therefore, as the cover is applied, it is first centered with respect to the wheel with the terminal flanges 18 disposed at the axially outer margin of the intermediate tire rim flange 10 and the cover is then pushed axially inwardly so that the edges of the retaining terminal flanges 18 cam against the intermediate tire rim flange and are stressed by resilinet flexure of the fingers 17 as the retaining terminals cam inwardly along the slope of the intermediate flange of the tire rim. By the time the underturned cover marginal flange 14 engages the limit shoulder 12, the fingers 17 have been substantially stressed radially inwardly and thus place the retaining edges of the terminal flanges 18 under substantial gripping retaining radially outward pressure against the tire rim intermediate flange 10. This serves effectively to retain the cover against axially outward displacement from the wheel.

Under some circumstances, and especially where the material, such as the sheet metal from which the cover 13 is made is of relatively low inherent resiliency, the resilient tension under which the retaining fingers are placed when in engagement with the tire rim may be sufficient to cause the retaining edges of the terminal flanges to grip the intermediate flange of the tire rim retainingly to hold the cover against axial displacement but there may yet be a tendency of the cover to turn relative to the wheel in response to torque forces encountered in service.

By the present invention any tendency of the cover to turn on the wheel is obviated by providing interengaging means on the retaining fingers and on the tire rim to prevent such turning. In the present instance such means comprise a groove-like depression formed in one of the retaining terminal flanges 18 receptive of an anti-turn abutment or interlock boss 20 provided on the tire rim intermediate flange 10.

In a preferred form, the interlock, anti-turn boss 20 is provided as an axially extending narrow rib pressed in the tire rim intermediate flange 10 as best seen in Figures 2 and 3. The length of the rib 20 is such that a substantial tolerance for interengagement of the retaining terminal flange 18 of the cooperting retaining finger in an axial direction therealong is provided. The anti-turn rib 20 extends substantially toward the axially outer portion of the tire rim intermediate flange so that in pushing the cover onto the wheel, the indentation 19 to receive the rib will be pressed in the flange 18 progressively as the cover is pressed home and the retaining terminal flange rides down in the registered relation with the rib.

While the anti-turn boss or rib 20 may be a single rib on the tire rim intermediate flange, a plurality of such ribs may be provided appropriately spaced conformable to the spacing of the retaining fingers on the cover.

It will be observed that at its opposite sides 21 the indentation 19 provides shoulders opposing and straddling the anti-turn rib 20, in substantially wrapped-on relation. Thus, the cover is effectively held against turning on the wheel.

To remove the cover, a suitable pry-off tool such as a screwdriver is applied under the peripheral rib 15 on the cover and levered thereagainst to draw the retaining fingers progressively axially outwardly until the cover is released. The indentation 19 remains in the flange 18 and may be re-registered with the rib 20 on re-applying the cover.

It will be understood that modifications and variations may be effected without departing from the scope of the novel concepts of the present invention.

I claim as my invention:

1. In a vehicle wheel including a generally axially extending annular part, a circular wheel cover for the outer side of the wheel including retaining fingers having generally radially extending terminal portions grippingly engageable with said generally axially extending part of the wheel for retaining the cover against axial displacement, and the axially extending part of the wheel provided with a generally axially extending rib, one of said fingers generally wrappingly engaging said rib.

2. In a wheel structure, a tire rim having an intermediate flange extending generally axially and radially outwardly, said tire rim having a generally axially elongated rib on its radially inner face, and a cover at the outer side of the wheel and having a retaining finger including a terminal flange retainingly engageable with the tire rim intermediate flange and having an indentation therein interlockingly straddling said rib.

3. In a wheel structure, a tire rim having an intermediate flange extending generally axially and radially outwardly, said tire rim having a generally axially elongated rib on its radially inner face, and a cover at the outer side of the wheel and having a retaining finger including a terminal flange retainingly engageable with the tire rim intermediate flange and having an indentation therein straddling said rib, said indentation having shoulders opposing the sides of said rib and resisting any tendency of the cover to turn relative to the wheel.

4. In a wheel structure, a tire rim having an intermediate flange etxending generally axially and radially outwardly, said tire rim having a generally axially elongated rib on its radially inner face, and a cover at the outer side of the wheel and having a retaining finger including a terminal flange retainingly engageable with the tire rim intermediate flange and having an indentation therein straddling said rib, said rib extending substantially toward the axially outer side of said tire rim intermediate flange for progressively pressing said indentation into said terminal flange in the application of the cover to the wheel.

GEORGE ALBERT LYON.

REFERENCES CITED

The following references are of record in the file of this patent:

UNITED STATES PATENTS

| Number | Name | Date |
|---|---|---|
| 2,113,541 | Blank | Apr. 5, 1938 |

FOREIGN PATENTS

| Number | Country | Date |
|---|---|---|
| 449,040 | Great Britain | June 19, 1936 |